(12) United States Patent
Jiang et al.

(10) Patent No.: US 11,716,690 B2
(45) Date of Patent: *Aug. 1, 2023

(54) METHOD AND DEVICE IN NODE FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: Dido Wireless Innovations LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/535,584

(22) Filed: Nov. 25, 2021

(65) Prior Publication Data

US 2022/0086764 A1 Mar. 17, 2022

Related U.S. Application Data

(63) Continuation of application No. 16/735,710, filed on Jan. 7, 2020, now Pat. No. 11,218,971.

(30) Foreign Application Priority Data

Jan. 7, 2019 (CN) .......................... 201910011201.4
Jul. 1, 2019 (CN) .......................... 201910585049.0

(51) Int. Cl.
  *H04W 52/06* (2009.01)
  *H04L 5/00* (2006.01)
(52) U.S. Cl.
  CPC ........... *H04W 52/06* (2013.01); *H04L 5/0048* (2013.01)
(58) Field of Classification Search
  CPC ..... H04W 52/06; H04W 52/42; H04W 52/36; H04W 52/18; H04L 5/0048; H04L 5/0053;

(Continued)

(56) References Cited

U.S. PATENT DOCUMENTS 10,651,910 B2 * 5/2020 Chen ..................... H04B 7/0626
10,708,028 B2 * 7/2020 Nam .................. H04W 72/0446

(Continued)

FOREIGN PATENT DOCUMENTS

CN      103096449 A      5/2013
CN      103918323 A      7/2014

(Continued)

OTHER PUBLICATIONS

Final report of 3GPP TSG RAN WG1 #71 V1.0.0 dated Feb. 1, 2013.

(Continued)

*Primary Examiner* — Jay P Patel

(57) ABSTRACT

The disclosure provides a method and a device in a node for wireless communication. A first node first receives a first bit field and Q second-type bit field(s), and then transmits L radio signal(s) at a first power value; the first bit field is used for determining a first reference signal resource set; each of the Q second-type bit field(s) indicates one power offset; the first power value is only related to power offsets indicated by all second-type bit fields among the Q second-type bit field(s) that correspond to a first index, and the first index is one of K1 indexes associated to the first reference signal resource set; and the first index is related to the L reference signal resource set(s). Multiple times of repetition based uplink transmissions employ a uniform power control mechanism under multiple beams, which reduces hardware requirements at terminal side and improves transmission performance.

20 Claims, 12 Drawing Sheets

(58) Field of Classification Search
CPC ..... H04L 27/2602; H04L 27/34; Y02D 30/70; H04B 7/0408; H04B 7/0617
See application file for complete search history.

(56) References Cited

U.S. PATENT DOCUMENTS

| | | | |
|---|---|---|---|
| 10,841,816 B2* | 11/2020 | Koskela | H04W 24/04 |
| 10,863,537 B2* | 12/2020 | Liou | H04W 72/1289 |
| 11,277,244 B2* | 3/2022 | Gao | H04L 5/0091 |
| 11,368,973 B2* | 6/2022 | Yoshimura | H04L 27/261 |
| 2011/0064159 A1 | 3/2011 | Ko | |
| 2015/0023265 A1* | 1/2015 | Park | H04L 27/2657 370/329 |
| 2018/0262313 A1* | 9/2018 | Nam | H04L 5/0044 |
| 2018/0287681 A1* | 10/2018 | Chen | H04L 5/0057 |
| 2019/0190669 A1* | 6/2019 | Park | H04L 5/0051 |
| 2019/0199497 A1* | 6/2019 | Park | H04L 5/0023 |
| 2019/0253986 A1* | 8/2019 | Jeon | H04W 72/042 |
| 2019/0254042 A1* | 8/2019 | Cirik | H04W 72/02 |
| 2019/0261280 A1* | 8/2019 | Jung | H04W 52/386 |
| 2019/0261281 A1* | 8/2019 | Jung | H04W 72/0473 |
| 2019/0261425 A1* | 8/2019 | Park | H04L 1/1819 |
| 2019/0273637 A1* | 9/2019 | Zhang | H04W 80/02 |
| 2019/0297640 A1* | 9/2019 | Liou | H04W 72/1215 |
| 2019/0320333 A1* | 10/2019 | Koskela | H04W 36/305 |
| 2019/0364561 A1* | 11/2019 | Xiong | H04W 72/046 |
| 2019/0373592 A1* | 12/2019 | Ji | H04W 72/042 |
| 2019/0379431 A1* | 12/2019 | Park | H04B 7/0408 |
| 2019/0394082 A1* | 12/2019 | Cirik | H04W 76/28 |
| 2019/0394757 A1* | 12/2019 | Zhang | H04B 7/0456 |
| 2020/0014455 A1* | 1/2020 | Gao | H04B 7/0626 |
| 2020/0015229 A1* | 1/2020 | Yang | H04W 72/1289 |
| 2020/0052837 A1* | 2/2020 | Zhang | H04W 80/02 |
| 2020/0053613 A1* | 2/2020 | Cirik | H04L 5/001 |
| 2020/0053757 A1* | 2/2020 | Bagheri | H04L 5/0035 |
| 2020/0053779 A1* | 2/2020 | Jeon | H04B 7/0695 |
| 2020/0053799 A1* | 2/2020 | Jeon | H04L 5/0048 |
| 2020/0092073 A1* | 3/2020 | Papasakellariou | H04L 5/0094 |
| 2020/0100311 A1* | 3/2020 | Cirik | H04B 7/0695 |
| 2020/0107277 A1* | 4/2020 | Jeon | H04W 52/36 |
| 2020/0120644 A1* | 4/2020 | Zhou | H04B 7/0689 |
| 2020/0154380 A1* | 5/2020 | Zhou | H04L 5/0094 |
| 2020/0154402 A1* | 5/2020 | Lee | H04L 5/0048 |
| 2020/0154489 A1* | 5/2020 | Zhou | H04W 56/001 |
| 2020/0221323 A1* | 7/2020 | Xu | H04B 7/0619 |
| 2020/0235798 A1* | 7/2020 | Chen | H04L 5/0053 |
| 2020/0245253 A1* | 7/2020 | Chen | H04W 52/242 |
| 2020/0260475 A1* | 8/2020 | Yoshimura | H04L 27/261 |
| 2020/0280483 A1* | 9/2020 | Zhang | H04B 7/06 |
| 2020/0305232 A1* | 9/2020 | Miao | H04L 5/0053 |
| 2020/0389883 A1* | 12/2020 | Faxér | H04L 5/0025 |
| 2021/0007063 A1* | 1/2021 | Yao | H04W 52/242 |
| 2021/0021394 A1* | 1/2021 | Wu | H04L 5/0094 |
| 2021/0051700 A1* | 2/2021 | Liou | H04W 72/042 |
| 2021/0091827 A1* | 3/2021 | Namba | H04B 17/309 |
| 2021/0091902 A1* | 3/2021 | Yamada | H04W 16/28 |
| 2021/0099963 A1* | 4/2021 | Jeon | H04W 74/0866 |
| 2021/0126677 A1* | 4/2021 | Park | H04B 7/0408 |
| 2021/0135818 A1* | 5/2021 | Chen | H04W 72/042 |
| 2021/0160126 A1* | 5/2021 | Cirik | H04W 52/0241 |
| 2021/0160875 A1* | 5/2021 | Zhang | H04W 40/22 |
| 2021/0160886 A1* | 5/2021 | Gutman | H04L 5/0051 |
| 2021/0168636 A1* | 6/2021 | Chen | H04L 5/006 |
| 2021/0184819 A1* | 6/2021 | Takeda | H04L 5/0057 |
| 2021/0185709 A1* | 6/2021 | Takeda | H04L 1/0009 |
| 2021/0250981 A1* | 8/2021 | Takeda | H04W 72/1257 |
| 2021/0259004 A1* | 8/2021 | Takeda | H04W 72/1289 |
| 2021/0274562 A1* | 9/2021 | Takeda | H04W 56/001 |
| 2021/0345310 A1* | 11/2021 | Zhang | H04B 7/0617 |
| 2021/0351975 A1* | 11/2021 | Matsumura | H04W 16/28 |

FOREIGN PATENT DOCUMENTS

| | | | | |
|---|---|---|---|---|
| CN | 108365939 A | | 8/2018 | |
| CN | 109041227 A | | 12/2018 | |
| CN | 109151973 A | | 1/2019 | |
| CN | 109392120 A | * | 2/2019 | ........... H04B 7/0617 |
| CN | 110535597 A | * | 12/2019 | ........... H04B 17/309 |
| CN | 110535598 A | * | 12/2019 | ........... H04B 17/373 |
| CN | 110769470 A | * | 2/2020 | ........... H04L 5/0048 |
| CN | 110943817 A | * | 3/2020 | ........... H04B 7/0695 |
| CN | 110971367 A | * | 4/2020 | ........... H04L 27/261 |
| CN | 110999477 A | * | 4/2020 | ........... H04B 7/0617 |
| CN | 111345106 A | * | 6/2020 | ........... B60M 1/346 |
| CN | 112351501 A | * | 2/2021 | ........... H04B 7/0695 |
| CN | 114189320 A | * | 3/2022 | ........... H04L 27/261 |
| CN | 110535597 B | * | 6/2022 | ........... H04B 17/309 |
| CN | 110535598 B | * | 6/2022 | ........... H04B 17/373 |
| EP | 3471327 A1 | * | 4/2019 | ........... H04B 7/0417 |
| EP | 3809774 A1 | * | 4/2021 | ............... H04L 1/08 |
| WO | 2018157365 A1 | | 9/2018 | |
| WO | WO-2018164515 A1 | * | 9/2018 | ........... H04L 5/0044 |
| WO | 2018210171 A1 | | 11/2018 | |
| WO | WO-2018203653 A1 | * | 11/2018 | ........... H04B 7/0417 |
| WO | WO-2019046005 A1 | * | 3/2019 | ............... H04B 1/38 |
| WO | WO-2019130847 A1 | * | 7/2019 | ........... H04B 17/318 |
| WO | WO-2019137051 A1 | * | 7/2019 | ........... H04W 28/06 |
| WO | WO-2020021723 A1 | * | 1/2020 | ........... H04B 7/0602 |
| WO | WO-2020021724 A1 | * | 1/2020 | ........... H04B 7/0658 |
| WO | WO-2020021725 A1 | * | 1/2020 | ............. H04B 7/063 |
| WO | WO-2020044409 A1 | * | 3/2020 | ........... H04L 5/0057 |
| WO | WO-2020051890 A1 | * | 3/2020 | ........... H04B 7/0695 |
| WO | WO-2020054036 A1 | * | 3/2020 | ........... H04W 16/28 |
| WO | WO-2020059140 A1 | * | 3/2020 | ........... H04B 17/373 |
| WO | WO-2020066021 A1 | * | 4/2020 | ............. H04B 7/022 |
| WO | WO-2020166624 A1 | * | 8/2020 | ......... H04W 52/146 |
| WO | WO-2020166625 A1 | * | 8/2020 | ......... H04W 52/242 |
| WO | WO-2020218254 A1 | * | 10/2020 | |
| WO | WO-2021090369 A1 | * | 5/2021 | |
| WO | WO-2021095104 A1 | * | 5/2021 | |

OTHER PUBLICATIONS

First Office Action received in application No. CN201910585049.0 From Chinese patent dated Nov. 23, 2020.
Second Office Action received in application No. CN201910585049.0 From Chinese patent dated Feb. 3, 2021.
First search report received in application No. CN201910585049.0 From Chinese patent dated Nov. 17, 2020.
CN201910585049.0 Notification to Grant Patent Right for Invention dated Mar. 31, 2021.
CN202110517916.4 FirstOffice Action dated Dec. 9, 2021.
CN202110517916.4 Second Office Action dated Apr. 26, 2022.
CN202110517916.4 First Search Report dated Dec. 1, 2021.

* cited by examiner

METHOD AND DEVICE IN NODE FOR WIRELESS COMMUNICATION

CROSS-REFERENCE TO RELATED APPLICATION

This application is a continuation of the U.S. patent application Ser. No. 16/735,710, filed on Jan. 7, 2020, which claims the priority benefit of Chinese Patent Application Serial Number 201910011201.4, filed on Jan. 7, 2019, and Chinese Patent Application Serial Number 201910585049.0, filed on Jul. 1, 2019, the full disclosure of which is incorporated herein by reference.

BACKGROUND

Technical Field

The disclosure relates to transmission methods and devices in wireless communication systems, and in particular to a method and a device for power control in wireless communication.

Related Art

Application scenarios of future wireless communication systems are becoming increasingly diversified, and different application scenarios have different performance requirements on systems. In order to meet different performance requirements of various application scenarios, in the design of Rel-15 New Radio (NR), beamforming is widely used to improve transmission performance. In Rel-16 NR systems, in order to further improve transmission performance and reduce transmission latency, the RAN #81 plenary session proposed a Study Item (SI) of physical layer enhancement for Ultra-Reliable and Low Latency Communication (NR URLLC). In this subject, the performance enhancement for an uplink PUSCH will be one of important research subjects.

SUMMARY

In Rel-15 NR systems, a Physical Uplink Shared Channel (PUSCH) already can support slot-level repetition transmissions to improve transmission performance, that is, one Transmission Block (TB) can be repeatedly transmitted in multiple slots to realize combined gains. In Rel-16, in order to further reduce latency, a PUSCH and a Physical Uplink Control Channel (PUCCH) will be repeatedly transmitted between multiple mini-slots to achieve an effect of reducing latency.

In Rel-16 and future mobile communication systems, no matter a base station or a terminal equipment will be configured with multiple panels, and a transmitting terminal will transmit multiple radio signals on multiple panels to achieve gains brought by beamforming. The above repetition transmissions of PUSCH and PUCCH can also be performed between multiple panels. However, in this scenario, power control methods for the radio signals repeatedly transmitted on multiple panels need to be redesigned.

One simple solution for the above problems is as follows: when multiple panels correspond to multiple Beam Pair Links (BPLs), transmit power values for the multiple panels can be adjusted separately. However, this method has high demands on the Radio Frequency (RF) and Power Amplifier (PA) of a transmitting terminal, and it is unnecessary. In view of the above problems, the disclosure provides a solution. It should be noted that, if no conflict is incurred, the embodiments of the first node of the disclosure and the characteristics in the embodiments may be applied to the base station, meanwhile the embodiments of the second node of the disclosure and the characteristics in the embodiments may be applied to the terminal equipment. The embodiments of the disclosure and the characteristics in the embodiments may be mutually combined arbitrarily if no conflict is incurred.

The disclosure provides a method in a first node for wireless communication, wherein the method includes:
receiving a first bit field and Q second-type bit field(s), the Q being a positive integer; and
transmitting L radio signal(s) at a first power value, the L being a positive integer and a first radio signal being one of the L radio signal(s).

Herein, the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; the first power value is only related to power offsets indicated by all second-type bit fields among the Q second-type bit field(s) that correspond to a first index, and the first index is one of the K1 indexes; the L radio signal(s) are Quasi Co-located (QCLed) with L reference signal resource set(s) respectively, the first reference signal resource set is one of the L reference signal resource set(s) that corresponds to the first radio signal; and the first index is related to the L reference signal resource set(s).

In one embodiment, the above method has the following benefits: the first reference signal resource set is associated to K1 indexes, and the first bit field is used for determining the K1 indexes; a reference signal resource associated to the first index among the K1 indexes is used for determining the first power value, that is, only when the L radio signal(s) are repeatedly transmitted, the first index takes effect; meanwhile, reference signal resources associated to other indexes among the K1 indexes are used for determining the power control of non-repetition transmission. The above method on one hand enables multiple panels to follow one same power control process, to reduce the complexity of implementation of the first node, and on the other hand reduces impacts to existing protocols under the premise of guaranteeing the flexibility of power control configuration and improves forward compatibility.

In one embodiment, the above method has another following benefit: the first power value is only related to power offsets indicated by all second-type bit fields among the Q second-type bit field(s) that correspond to the first index; that is, the L repeatedly transmitted radio signal(s) follow one Transmission Power Control (TPC) process associated to the first index, while second-type bit field(s) among the Q second-type bit field(s) that correspond to non-first index are still associated to respective TCP processes, to further improve the flexibility of power control.

According to one aspect of the disclosure, the above method includes:
receiving a first signaling.
Herein, the first signaling is used for determining that the first reference signal resource set is associated to K1 indexes.

According to one aspect of the disclosure, the above method includes:
receiving a second signaling.
Herein, the second signaling is used for indicating the L reference signal resource set(s).

According to one aspect of the disclosure, the above method includes:

receiving a third signaling.

Herein, the third signaling is used for indicating L reference signal resource pool(s); any one of the L reference signal resource pool(s) includes M1 reference signal resource sets; the L reference signal resource set(s) is(are) one subset in the L reference signal resource pool(s); and the M1 is a positive integer greater than 1.

According to one aspect of the disclosure, the above method includes:

receiving a fourth signaling.

Herein, the fourth signaling is used for determining a first time unit set; the first time unit set includes a positive integer number of time units; and time-domain resources occupied by any one of the L radio signal(s) belong to the first time unit set.

In one embodiment, the above method has the following benefits: the above power control scheme for the repeatedly transmitted L radio signal(s) are employed in the first time unit set only, which simplifies the operation of the first node and reduces the complexity of the first node.

The disclosure provides a method in a second node for wireless communication, wherein the method includes:

transmitting a first bit field and Q second-type bit field(s), the Q being a positive integer; and receiving L radio signal(s), the L being a positive integer and a first radio signal being one of the L radio signal(s).

Herein, the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; transmit power value(s) of the L radio signal(s) all are a first power value; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

According to one aspect of the disclosure, the above method includes:

transmitting a first signaling.

Herein, the first signaling is used for determining that the first reference signal resource set is associated to K1 indexes.

According to one aspect of the disclosure, the above method includes:

transmitting a second signaling.

Herein, the second signaling is used for indicating the L reference signal resource set(s).

According to one aspect of the disclosure, the above method includes:

transmitting a third signaling.

Herein, the third signaling is used for indicating L reference signal resource pool(s); any one of the L reference signal resource pool(s) includes M1 reference signal resource sets; the L reference signal resource set(s) is(are) one subset in the L reference signal resource pool(s); and the M1 is a positive integer greater than 1.

According to one aspect of the disclosure, the above method includes:

transmitting a fourth signaling.

Herein, the fourth signaling is used for determining a first time unit set, the first time unit set includes a positive integer number of time units; and time-domain resources occupied by any one of the L radio signal(s) belong to the first time unit set.

The disclosure provides a first node for wireless communication, wherein the first node includes:

a first receiver, to receive a first bit field and Q second-type bit field(s), the Q being a positive integer; and a first transmitter, to transmit L radio signal(s) at a first power value, the L being a positive integer and a first radio signal being one of the L radio signal(s).

Herein, the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

The disclosure provides a second node for wireless communication, wherein the second node includes:

a second transmitter, to transmit a first bit field and Q second-type bit field(s), the Q being a positive integer; and a second receiver, to receive L radio signal(s), the L being a positive integer and a first radio signal being one of the L radio signal(s).

Herein, the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; transmit power value(s) of the L radio signal(s) all are a first power value; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

In one embodiment, compared with conventional schemes, the disclosure has the following advantages.

The first reference signal resource set is associated to K1 indexes, and the first bit field is used for determining the K1 indexes; a reference signal resource associated to the first index among the K1 indexes is used for determining the first power value, that is, only when the L radio signal(s) are repeatedly transmitted, the first index takes effect; meanwhile, reference signal resources associated to other indexes among the K1 indexes are used for determining the power control of non-repetition transmission. The above method on one hand enables multiple panels to follow one same power control process, to reduce the complexity of implementation of the first node, and on the other hand reduces impacts to existing protocols under the premise of guaranteeing the flexibility of power control configuration and improves forward compatibility.

The first power value is only related to power offsets indicated by all second-type bit fields among the Q second-type bit field(s) that correspond to the first index; that is, the L repeatedly transmitted radio signal(s) follow one Transmission Power Control (TPC) process associated to the first index, while second-type bit field(s) among the Q second-type bit field(s) that correspond to non-first index are still associated to respective TCP processes, to further improve the flexibility of power control.

The above power control scheme for the repeatedly transmitted L radio signal(s) are employed in the first time unit set only, which simplifies the operation of the first node and reduces the complexity of the first node.

BRIEF DESCRIPTION OF THE DRAWINGS

Other features, purposes and advantages of the disclosure will become more apparent from the detailed description of non-restrictive embodiments taken in conjunction with the following drawings.

FIG. 8 is a diagram illustrating a second signaling according to the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
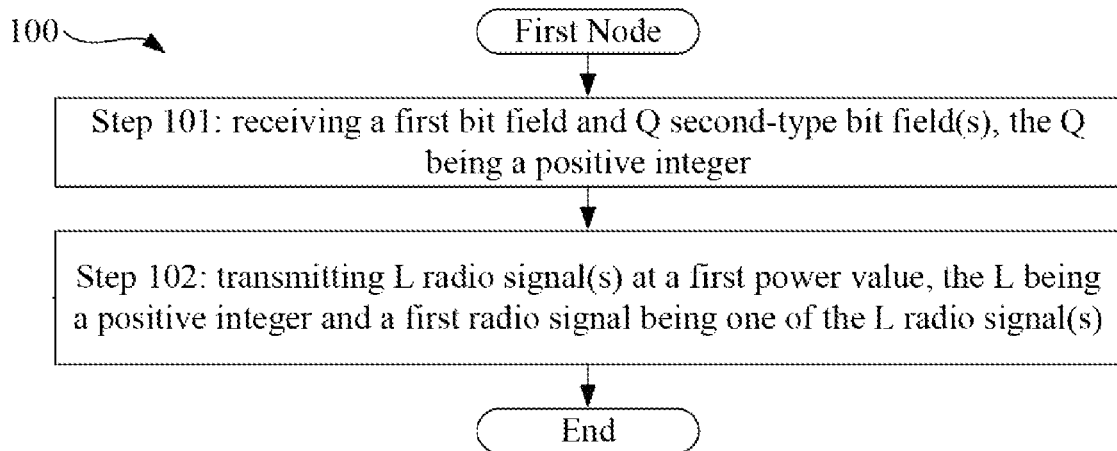
FIG. 1 is a flowchart of processing of a first node according to one embodiment of the disclosure.

Embodiment 1 illustrates an example of a flowchart of processing of a first node, as shown in FIG. 1. In 100 shown in FIG. 1, each box represents one step. In Embodiment 1, the first node in the disclosure receives a first bit field and Q second-type bit field(s) in S101, the Q being a positive integer, and transmits L radio signal(s) at a first power value in S102, the L being a positive integer and a first radio signal being one of the L radio signal(s).

In Embodiment 1, the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

In one embodiment, if the L is greater than 1, time-domain resources occupied by any two of the L radio signals are orthogonal (that is, non-overlapping).

In one embodiment, the L is greater than 1.

In one embodiment, the L is equal to 1.

In one embodiment, the first bit field is an SRS Resource Indicator (SRI).

In one embodiment, the first bit field is used for determining an SRS-Resource index.

In one embodiment, the first bit field is used for indicating an SRS-PUSCH-PowerControlId.

In one embodiment, the first bit field is used for determining one group of PUSCH power control parameters, and the one group of PUSCH power control parameters belongs to one SRI-PUSCH-PowerControl field in TS38.331.

In one subembodiment of the above two embodiments, the SRI-PUSCH-PowerControl field determined by the first bit field includes the SRS-PUSCH-PowerControlId indicated by the first bit field.

In one subembodiment of the above two embodiments, the one group of PUSCH power control parameters determined by the first bit field includes at least one of an sri-P0-PUSCH-AlphaSetId and an sri-PUSCH-ClosedLoop-Index.

In one embodiment, the first bit filed is transmitted through a physical layer dynamic signaling.

In one subembodiment, the physical layer dynamic signaling transmitting the first bit field is one DCI, and a format of the DCI is a DIC Format 0_1.

In one subembodiment, the physical layer dynamic signaling transmitting the first bit field is one DCI, and a format of the DCI is a DIC Format 2_2.

In one embodiment, the Q second-type bit field(s) are transmitted in Q physical layer dynamic signaling(s) respectively.

In one subembodiment, one of the Q physical layer dynamic signaling(s) is one DCI, and a format of the DCI is a DCI Format 0_1.

In one subembodiment, one of the Q physical layer dynamic signaling(s) is one DCI, and a format of the DCI is a DCI Format 0_0.

In one subembodiment, one of the Q physical layer dynamic signaling(s) is one DCI, and a format of the DCI is a DCI Format 2_2.

In one subembodiment, one of the Q physical layer dynamic signaling(s) is one DCI, and a format of the DCI is a DCI Format 2_3.

In one subembodiment, one of the Q physical layer dynamic signaling(s) is one DCI, and a format of the DCI is a DCI Format 1_0.

In one subembodiment, one of the Q physical layer dynamic signaling(s) is one DCI, and a format of the DCI is a DCI Format 1_1.

In one embodiment, one last second-type bit field transmitted in time domain among the Q second-type bit field(s) and the first bit field are transmitted in one same physical layer signaling.

In one embodiment, the Q second-type bit field(s) include(s) only one second-type bit field corresponding to the first index.

In one embodiment, the Q second-type bit field(s) include(s) Q1 second-type bit field(s), and the Q1 second-type bit field(s) is(are) all corresponding to the first index, the Q1 being a positive integer not greater than the Q.

In one embodiment, the above phrase that the first bit field is used for determining a first reference signal resource set means that: the first bit filed is used for determining one SRI-PUSCH-PowerControl field, and the SRI-PUSCH-PowerControl field is associated to the first reference signal resource set.

In one subembodiment, the first reference signal resource set includes K1 reference signal resources, and the K1 reference signal resources are corresponding to K1 indexes respectively.

In one subembodiment, the K1 indexes are K1 sri-PUSCH-PathlossReferenceRS-Ids in TS 38.331 respectively.

In one subembodiment, any one of the K1 reference signal resource(s) is one of a Synchronization Signal Block (SSB), a Channel State Information Reference Signal (CSI-RS) and a Sounding Reference Signal (SRS).

In one subembodiment, any one of the K1 indexes is one of an ssb-Index and and a csi-RS-Index.

In one subembodiment, the SRI-PUSCH-PowerControl field associated to the first reference signal resource set includes K indexes.

In one embodiment, the first reference signal resource set is one of M1 candidate reference signal resource sets, the M1 being a positive integer greater than 1; any one of the M1 candidate reference signal resource sets includes a positive integer number of reference signal resources; and the first bit field is used for indicating the first reference signal resource set from the M1 candidate reference signal resource sets.

In one subembodiment, the M1 candidate reference signal resource sets correspond to M1 SRI-PUSCH-PowerControl fields respectively.

In one subembodiment, the M1 candidate reference signal resource sets correspond to M1 SRI-PUSCH-PowerControl-Ids respectively.

In one embodiment, the first power value is equal to $P_1$, and the $P_1$ is determined by the following formula:

$$P_1 = P_{o\_PUSCH,b,f,c}(j) + 10\log_{10}(2^{\mu} M_{RB,b,f,c}^{PUSCH}(i)) +$$

$$\alpha_{b,f,c}(j) PL_{b,f,c}(q_d) + \Delta_{TF,b,f,c}(i) + f_{b,f,c}(i, l)$$

where the $P_{o\_PUSCH,b,f,c}(j)$ is determined through the first bit field, the $10\log_{10}(2^{\mu}M_{RB,b,f,c}^{PUSCH}(i))$ is related to a number of Resource Blocks (RBs) occupied by the first radio signal, the $\alpha_{b,f,c}(j)$ and the $PL_{b,f,c}(q_d)$ are determined through the first bit field, the $\Delta_{TF,b,f,c}(i)$ is related to a Modulation and Coding Scheme (MCS) employed by the first radio signal, and the $f_{b,f,c}(i, l)$ is related to power offsets indicated by all second-type bit fields among the Q second-type bit field(s) that correspond to the first index.

In one embodiment, the Q second-type bit field(s) correspond to Q TPC Command for scheduled PUSCH field(s) respectively.

In one subembodiment, the Q TPC Command for scheduled PUSCH field(s) is(are) transmitted in Q DIC(s) respectively.

In one embodiment, the Q second-type bit field(s) include(s) at least one second-type bit field which is received by the first node before the first bit field.

In one embodiment, (Q−1) second-type bit field(s) among the Q second-type bit field(s) is(are) all received by the first node before the first bit field.

In one embodiment, the phrase that the first index is related to the L reference signal resource set(s) means that: the first index is related to the L.

In one embodiment, the phrase that the first index is related to the L reference signal resource set(s) means that: when the L is 1, the first index is configured through a higher layer signaling.

In one embodiment, the phrase that the first index is related to the L reference signal resource set(s) means that: when the L is 1, the first index is configured through a Radio Resource Control (RRC) signaling.

In one embodiment, the phrase that the first index is related to the L reference signal resource set(s) means that: when the L is greater 1, the first index is configured through an RRC signaling, and the L radio signals are generated by one same bit block.

In one subembodiment, the first index is used only when the L radio signal(s) is(are) generated by one same bit block.

In one embodiment, the phrase that the first index is related to the L reference signal resource set(s) means that: when the L is greater 1, the first index is related to a reference signal resource index corresponding to an earliest transmitted radio signal among the L radio signals.

In one embodiment, L bit field(s) is(are) used for determining the first index from the K1 indexes, the L bit field(s) identifies(identify) the L reference signal resource set(s) respectively, and the first bit field is one of the L bit fields.

In one embodiment, the L bit field(s) is(are) L SRIs respectively.

In one embodiment, the L reference signal resource set(s) is(are) used for determining the first index from the K1 indexes.

In one embodiment, the first bit field is used for determining the K1 indexes; the L is greater than 1, (L−1) bit field(s) among L bit fields other than the first bit field is(are) used for determining the first index from the K1 indexes, the L bit fields identifies(identify) the L reference signal resource set(s) respectively, and the first bit field is one of the L bit fields.

In one embodiment, any one of the L reference signal resource set(s) includes a reference signal resource identified by the first index, and there is no reference signal resource whose corresponding index belongs to the L reference signal resource set(s) simultaneously; the L bit field(s) identifies (identify) the L reference signal resource set(s) respectively; and the first index is used for determining the first power value.

In one embodiment, the K1 is 2.

In one subembodiment, the K1 indexes are the first index and a second index respectively; the first index takes effect only when the first radio signal is one transmission among multiple repetition transmissions of one TB, and the second index takes effect when the first radio signal is a non-repetition transmission of one TB.

In one embodiment, the K1 is 3.

In one subembodiment, only the first index among the K1 indexes takes effect when the first radio signal is one transmission among multiple repetition transmissions of one TB.

In one embodiment, any two radio signals adjacent in time domain among the L radio signals occupy consecutive multicarrier symbols.

In one embodiment, the L is greater than 1, and the L radio signals are scheduled by one same DCI.

In one subembodiment, the one same DCI scheduling the L radio signals include the first bit field.

In one embodiment, the L is greater than 1, the L radio signals not only are QCLed with the L reference signal resource sets respectively, but also carry same information.

In one embodiment, the L radio signal(s) is(are) generated by a same TB.

In one embodiment, the L radio signal(s) is(are) L repetition transmission(s) of one TB.

In one embodiment, the phrase that the L radio signals are QCLed with the L reference signal resource sets respectively means that: a given radio signal is any one of the L radio signal(s), and the given radio signal is corresponding to a given reference signal resource set among the L reference signal resource sets; the given radio signal is QCLed with the given reference signal resource set.

In one subembodiment, the phrase that the given radio signal is QCLed with the given reference signal resource set means that: the given reference signal resource set includes a positive integer number of antenna ports, and the first node can deduce all or partial large-scale properties of the given radio signal from all or partial large-scale properties of radio signals received on the positive integer number of antenna ports; the large-scale properties include one or more of delay spread, doppler spread, doppler shift, path loss or average gain.

In one subembodiment, the phrase that the given radio signal is QCLed with the given reference signal resource set means that: the given reference signal resource set includes a positive integer number of antenna ports, and the first node determines a transmitting beamforming vector of the given radio signal according to radio signals received on the positive integer number of antenna ports; the transmitting beamforming vector includes at least one of an analog beamforming matrix, a digital beamforming matrix, an analog beamforming vector or a digital beamforming vector.

In one subembodiment, the phrase that the given radio signal is QCLed with the given reference signal resource set means that: the given reference signal resource set includes a positive integer number of antenna ports, and the first node determines a precoder of the given radio signal according to radio signals received on the positive integer number of ports.

In one embodiment, any one of the L radio signal(s) occupies one mini-slot, and the mini-slot includes a positive integer number of multicarrier symbols.

In one embodiment, the multicarrier symbol in the disclosure is an Orthogonal Frequency Division Multiplexing (OFDM) symbol.

In one embodiment, the multicarrier symbol in the disclosure is a Single-Carrier Frequency Division Multiple Access (SC-FDMA) symbol.

In one embodiment, the multicarrier symbol in the disclosure is a Filter Bank Multi Carrier (FBMC) symbol.

In one embodiment, the multicarrier symbol in the disclosure is an OFDM symbol including a Cyclic Prefix (CP).

In one embodiment, the multicarrier symbol in the disclosure is one of Discrete Fourier Transform Spreading Orthogonal Frequency Division Multiplexing (DFT-s-OFDM) symbols including CPs.

In one embodiment, any one of the L reference signal resource set(s) include(s) a positive integer number of antenna ports.

In one embodiment, any one of the L reference signal resource set(s) include(s) a positive integer number of SRS resources.

In one embodiment, any one of the L reference signal resource set(s) include(s) a positive integer number of CSI-RS resources.

In one embodiment, any one of the L reference signal resource set(s) include(s) a positive integer number of SSB resources.

In one embodiment, any one of the L reference signal resource set(s) include(s) a positive integer number of reference signal resources, and the positive integer number of reference signal resources correspond to a positive integer number of sri-PUSCH-PathlossReferenceRS-Ids respectively.

In one embodiment, any one of the L reference signal resource set(s) include(s) a positive integer number of reference signal resources, and the positive integer number of reference signal resources correspond to a positive integer number of indexes respectively.

In one embodiment, each of the L reference signal resource set(s) indicates one analog beamforming vector.

In one embodiment, the first power value is in unit of dBm.

In one embodiment, a power offset is in unit of dB.

In one embodiment, the first power value is in unit of mW.

In one embodiment, a power offset is in unit of multiple.

In one embodiment, a power offset is one candidate offset in a candidate offset set, and the candidate offset set includes a positive integer number of candidate offsets.

In one embodiment, the candidate offset set includes 0 dB.

In one embodiment, the candidate offset set includes −4 dB and 4 dB.

In one embodiment, the candidate offset set includes −1 dB, 1 dB and 3 dB.

In one embodiment, the candidate offset set includes −1 dB, 1 dB and 3 dB.

In one embodiment, the candidate offset set includes −4 dB, −1 dB, 1 dB and 4 dB.

In one embodiment, the first bit field includes a positive integer number of bits.

In one embodiment, any one of the Q second-type bit field(s) includes a positive integer number of bits.

In one embodiment, the first bit field is configured semi-statically.

In one embodiment, the first bit field is configured dynamically.

In one embodiment, the first bit field and one of the Q second-type bit field(s) belong to one same dynamic signaling.

In one embodiment, the dynamic signaling is a DCI, and the first node is a UE.

In one embodiment, the dynamic signaling is a UCI, and the first node is a base station.

In one embodiment, the L reference signal resource set(s) correspond to L panel(s) respectively, and the L radio signal(s) is(are) transmitted by the first node on the L panel(s) respectively.

In one embodiment, the L reference signal resource set(s) correspond to L panel(s) respectively, and the L radio signal(s) is(are) received by the second node in the disclosure on the L panel(s) respectively.

In one embodiment, the L reference signal resource set(s) correspond to L Beam Pair Links (BPLs) respectively.

In one embodiment, a physical layer channel carrying the first bit field is a Physical Downlink Control Channel (PDCCH).

In one embodiment, physical layer channel(s) carrying the Q second-type bit field(s) is(are) Q PDCCHs respectively.

In one embodiment, physical layer channel(s) occupied by the L radio signal(s) all are PDCCHs.

In one embodiment, physical layer channel(s) occupied by the L radio signal(s) all are PUSCHs.

Embodiment 2

Figure 2:
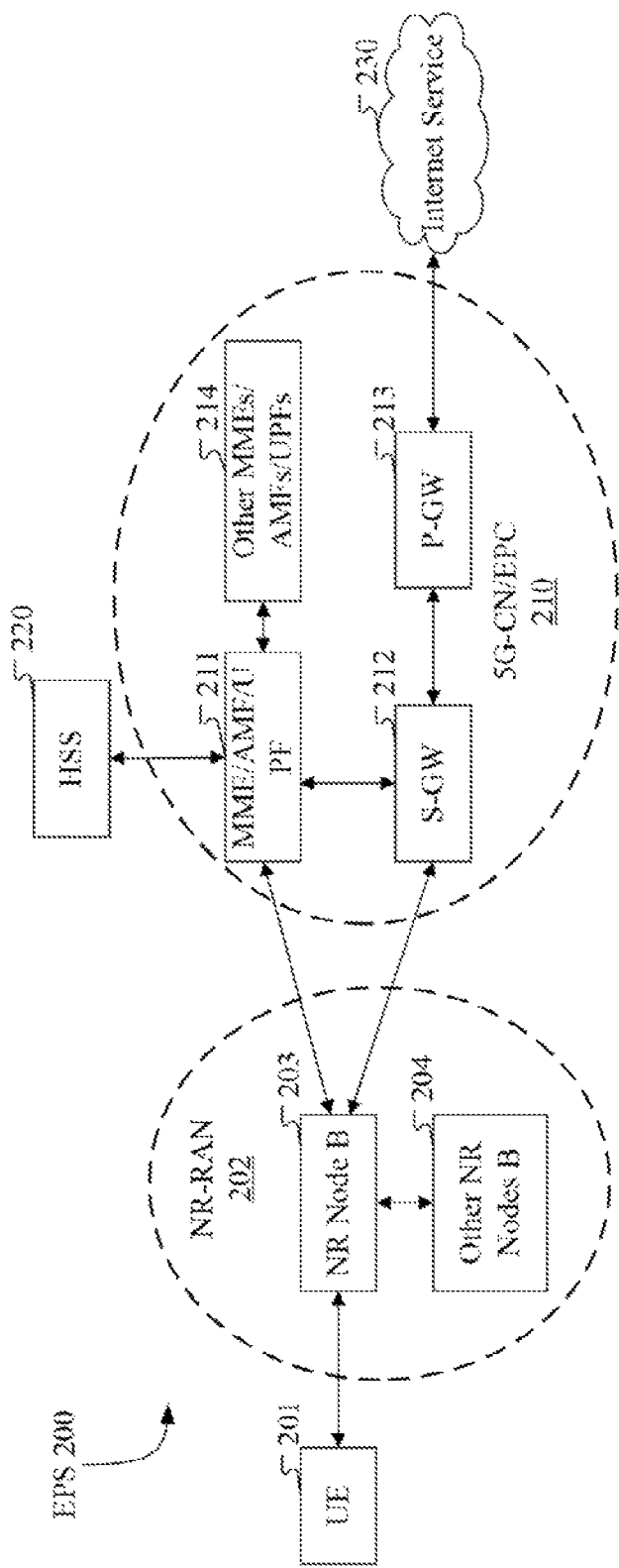
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the gNB 203 corresponds to the second node in the disclosure.

In one embodiment, an air interface between the UE 201 and the gNB 203 is a Uu interface.

In one embodiment, a radio link between the UE 201 and the gNB 203 is a cellular link.

In one embodiment, the first node in the disclosure is the UE 201, and the second node in the disclosure is gNB 203.

In one embodiment, the first node in the disclosure is the gNB 203, and the second node in the disclosure is UE 201.

In one embodiment, the UE 201 supports a physical layer enhancement technology for NR URLLC.

In one embodiment, the gNB 203 supports a physical layer enhancement technology for NR URLLC.

Embodiment 3

Figure 3:
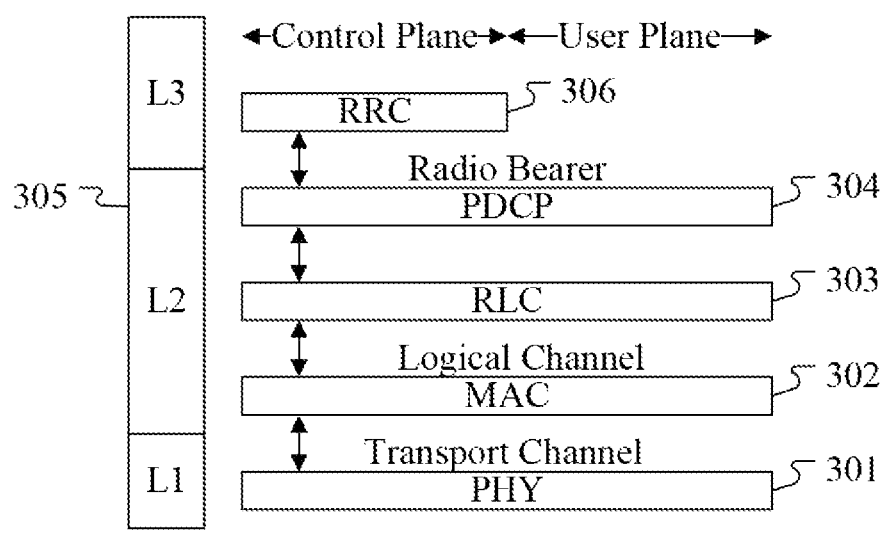
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a first node and a second node is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first node and the second node over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the eNB on the network side. Although not shown in FIG. 3, the first node may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between second nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among first nodes. The MAC sublayer 302 is also in charge of HARQ operations. In the control plane, the radio protocol architecture of the first node and the second node is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the first node and the second node.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first bit field in the disclosure is generated on the PHY 301.

In one embodiment, any one of the Q second-type bit field(s) in the disclosure is generated on the PHY 301.

In one embodiment, the L radio signal(s) in the disclosure is(are) all generated on the PHY 301.

In one embodiment, the L radio signal(s) in the disclosure is(are) all generated on the MAC sublayer 301.

In one embodiment, the first signaling in the disclosure is generated on the PHY 301.

In one embodiment, the first signaling in the disclosure is generated on the RRC sublayer 306.

In one embodiment, the second signaling in the disclosure is generated on the PHY 301.

In one embodiment, the second signaling in the disclosure is generated on the RRC sublayer 306.

In one embodiment, the third signaling in the disclosure is generated on the RRC sublayer 306.

In one embodiment, the fourth signaling in the disclosure is generated on the RRC sublayer 306.

Embodiment 4

Figure 4:
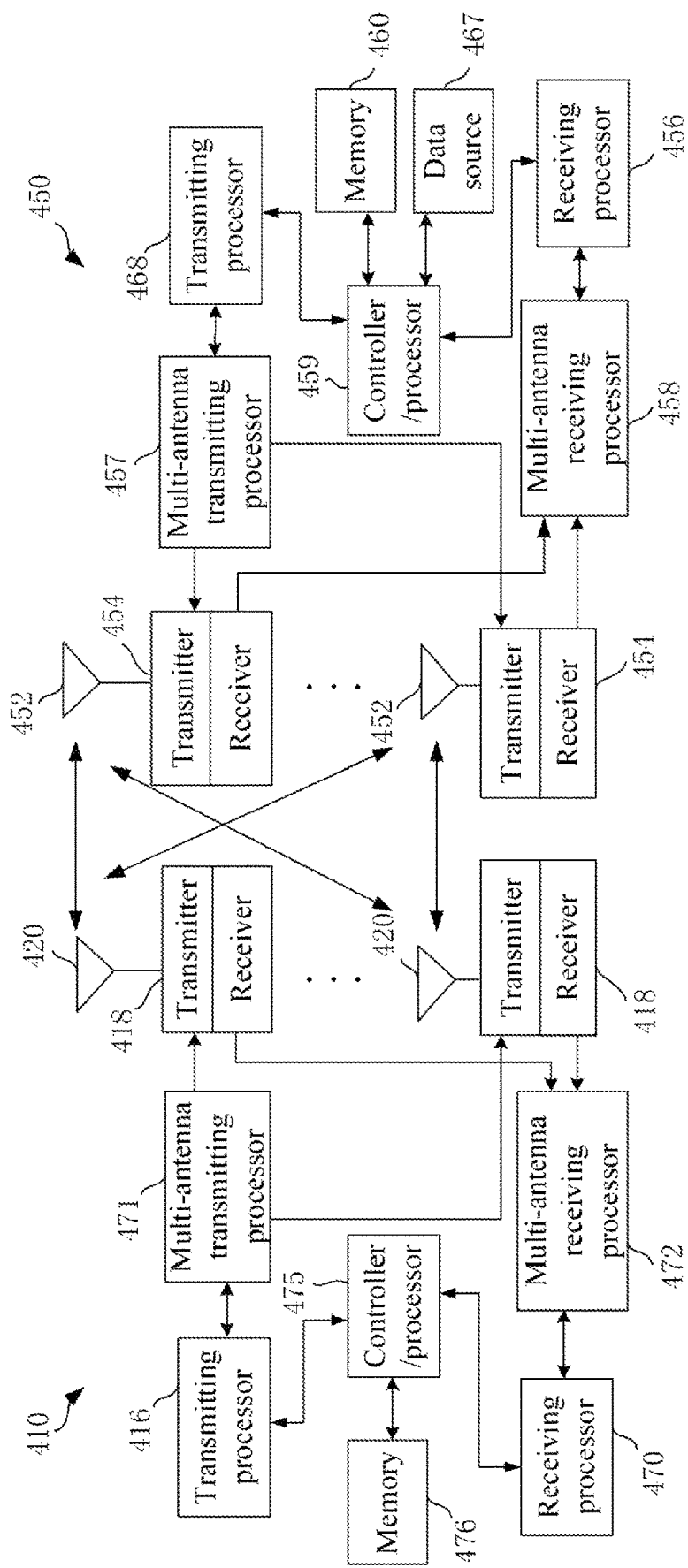
FIG. 4 is a diagram illustrating a first communication equipment and a second communication equipment according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with a transmitting analog precoding/beamforming operation. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multi carrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first bit field and Q second-type bit field(s), the Q being a positive integer, and transmits L radio signal(s) at a first power value, the L being a positive integer and a first radio signal being one of the L radio signal(s); the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

In one embodiment, the first communication equipment 450 includes a memory that stores a computer readable instruction program. The computer readable instruction program generates an action when executed by at least one processor. The action includes: receiving a first bit field and Q second-type bit field(s), the Q being a positive integer; and transmitting L radio signal(s) at a first power value, the L being a positive integer and a first radio signal being one of the L radio signal(s); the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first bit field and Q second-type bit field(s), the Q being a positive integer, and receives L radio signal(s), the L being a positive integer and a first radio signal being one of the L radio signal(s); the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; transmit power value(s) of the L radio signal(s) all are a first power value; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

In one embodiment, the second communication equipment 410 includes a memory that stores a computer readable instruction program. The computer readable instruction program generates an action when executed by at least one processor. The action includes: transmitting a first bit field and Q second-type bit field(s), the Q being a positive integer; and receiving L radio signal(s), the L being a positive integer and a first radio signal being one of the L radio signal(s); the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; transmit power value(s) of the L radio signal(s) all are a first power value; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

In one embodiment, the first communication equipment 450 corresponds to the first node in the disclosure.

In one embodiment, the second communication equipment 410 corresponds to the second node in the disclosure.

In one embodiment, the first communication equipment 450 is one UE.

In one embodiment, the second communication equipment 410 is one base station.

In one embodiment, at least one of the antenna 452, the receiver 454, the multi-antenna receiving processor 458, the receiving processor 456 or the controller/processor 459 is used for receiving a first bit field and Q second-type bit field(s), the Q being a positive integer; and at least one of the antenna 420, the transmitter 418, the multi-antenna transmitting processor 471, the transmitting processor 416 or the controller/processor 475 is used for transmitting a first bit field and Q second-type bit field(s), the Q being a positive integer.

In one embodiment, at least one of the antenna 452, the transmitter 454, the multi-antenna transmitting processor 457, the transmitting processor 468 or the controller/processor 459 is used for transmitting L radio signal(s) at a first power value, the L being a positive integer and a first radio signal being one of the L radio signal(s); and at least one of the antenna 420, the receiver 418, the multi-antenna receiving processor 472, the receiving processor 470 or the controller/processor 475 is used for receiving L radio signal(s), the L being a positive integer and a first radio signal being one of the L radio signal(s).

In one embodiment, at least one of the antenna 452, the receiver 454, the multi-antenna receiving processor 458, the receiving processor 456 or the controller/processor 459 is used for receiving a first signaling; and at least one of the antenna 420, the transmitter 418, the multi-antenna transmitting processor 471, the transmitting processor 416 or the controller/processor 475 is used for transmitting a first signaling.

In one embodiment, at least one of the antenna 452, the receiver 454, the multi-antenna receiving processor 458, the receiving processor 456 or the controller/processor 459 is used for receiving a second signaling; and at least one of the antenna 420, the transmitter 418, the multi-antenna transmitting processor 471, the transmitting processor 416 or the controller/processor 475 is used for transmitting a second signaling.

In one embodiment, at least one of the antenna 452, the receiver 454, the multi-antenna receiving processor 458, the receiving processor 456 or the controller/processor 459 is used for receiving a third signaling; and at least one of the antenna 420, the transmitter 418, the multi-antenna transmitting processor 471, the transmitting processor 416 or the controller/processor 475 is used for transmitting a third signaling.

In one embodiment, at least one of the antenna 452, the receiver 454, the multi-antenna receiving processor 458, the receiving processor 456 or the controller/processor 459 is used for receiving a fourth signaling; and at least one of the antenna 420, the transmitter 418, the multi-antenna transmitting processor 471, the transmitting processor 416 or the controller/processor 475 is used for transmitting a fourth signaling.

Embodiment 5

Figure 5:
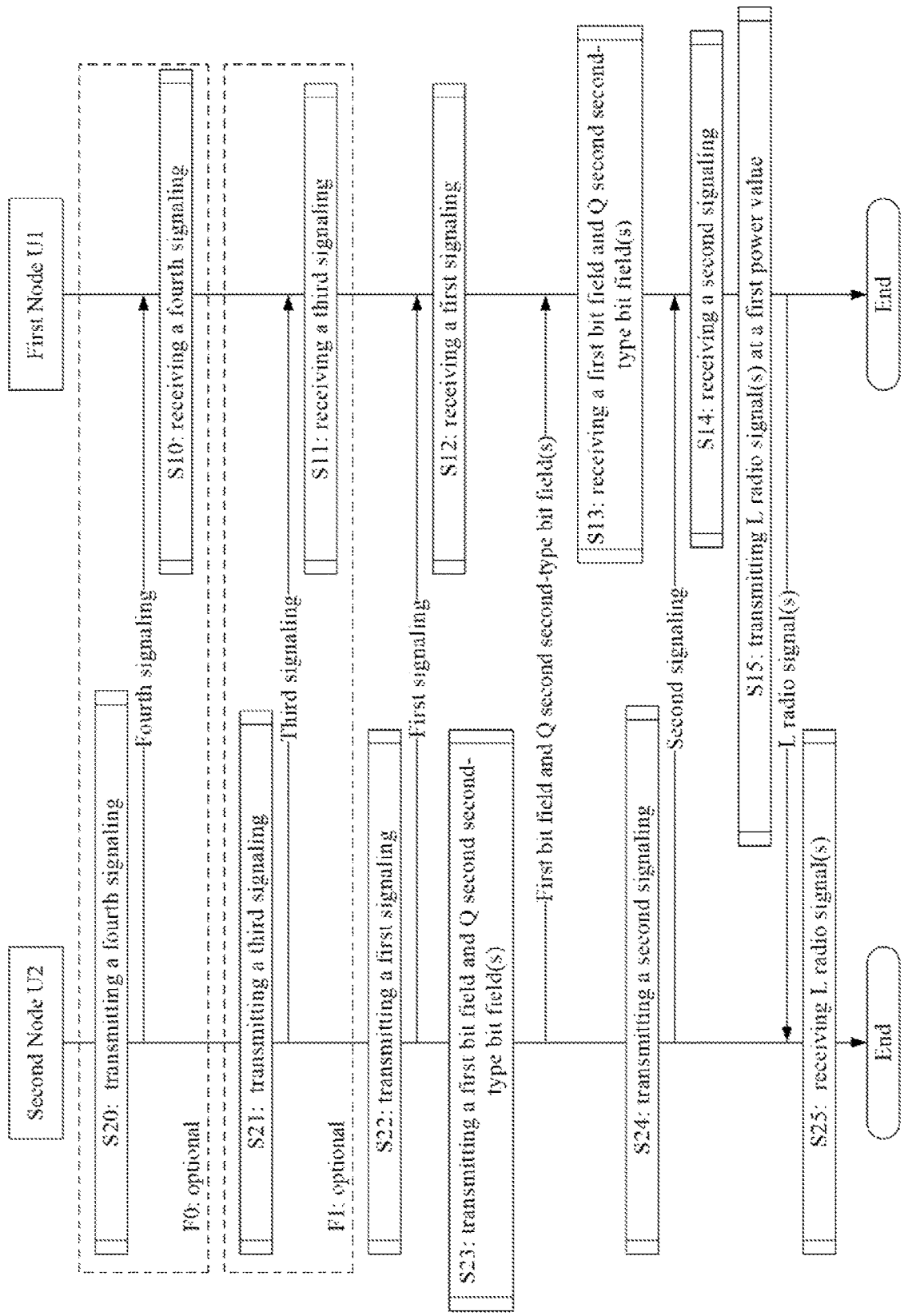
FIG. 5 is a flowchart of L radio signals according to one embodiment of the disclosure.

Embodiment 5 illustrates an example of a flowchart of L radio signal(s), as shown in FIG. 5. In FIG. 5, a first node U1 communicates with a second node U2 through an air interface. Steps in boxes F0 and F1 are optional.

The first node U1 receives a fourth signaling in S10, receives a third signaling in S11, receives a first signaling in S12, receives a first bit field and Q second second-type bit field(s) in S13, receives a second signaling in S14, and transmits L radio signal(s) at a first power value in S15.

The second node U2 transmits a fourth signaling in S20, transmits a third signaling in S21, transmits a first signaling in S22, transmits a first bit field and Q second second-type bit field(s) in S23, transmits a second signaling in S24, and receives L radio signal(s) in S25.

In Embodiment 5, the Q is a positive integer; the L is a positive integer, and a first radio signal is one of the L radio signal(s); the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; the first index is related to the L reference signal resource set(s); the first signaling is used for determining that the first reference signal resource set is associated to K1 indexes; the second signaling is used for indicating the L reference signal resource set(s); the third signaling is used for indicating L reference signal resource pool(s); any one of the L reference signal resource pool(s) includes M1 reference signal resource sets; the L reference signal resource set(s) is(are) one subset in the L reference signal resource pool(s); the M1 is a positive integer greater than 1; the fourth signaling is used for determining a first time unit set; the first time unit set includes a positive integer number of time units; and time-domain resources occupied by any one of the L radio signal(s) belong to the first time unit set.

In one embodiment, the first signaling includes K1 parameter groups, and the K1 indexes correspond to indexes of the K1 parameter groups respectively.

In one embodiment, the first signaling is an RRC signaling.

In one embodiment, the first signaling is the first node specific.

In one embodiment, the first signaling is a higher layer signaling.

In one embodiment, the first signaling includes the SRI-PUSCH-PowerControl in TS 38.331.

In one subembodiment, the SRI-PUSCH-PowerControl included in the first signaling includes multiple sri-PUSCH-PathlossReferenceRS-Ids.

In one subembodiment, the SRI-PUSCH-PowerControl included in the first signaling includes one sri-PUSCH-PowerControlId only.

In one embodiment, the second signaling is used for indicating L bit field(s), the L bit field(s) identifies(identify) the L reference signal resource set(s) respectively, and the first bit field is one of the L bit field(s).

In one embodiment, the second signaling is used for triggering transmission(s) of the L radio signal(s).

In one embodiment, the second signaling includes scheduling information of the L radio signal(s).

In one subembodiment, the scheduling information included in the second signaling includes occupied frequency-domain resources.

In one subembodiment, the scheduling information included in the second signaling includes occupied time-domain resources.

In one subembodiment, the scheduling information included in the second signaling includes an MCS, a Hybrid Automatic Repeat request (HARD) process number and a Redundancy Version (RV).

In one embodiment, the second signaling is a higher layer signaling.

In one embodiment, the second signaling is a scheduling signaling of the first radio signal.

In one embodiment, the second signaling is an RRC signaling.

In one embodiment, the second signaling is a physical layer signaling.

In one embodiment, the second signaling is one DCI.

In one embodiment, the first bit field is equal to one of R integers, and the R is equal to the M1.

In one embodiment, the second signaling is used for indicating the L reference signal resource set(s) from the L reference signal resource pool(s).

In one subembodiment, the second signaling includes a second bit field, and the second bit field is used for indicating the L reference signal resource set(s) from the L reference signal resource pool(s).

In one subembodiment, index(es) of the L reference signal resource set(s) in the L reference signal resource pool(s) are the same.

In one subembodiment, the second signaling includes L bit field(s), and the L bit field(s) are used for indicating the L reference signal resource set(s) from the L reference signal resource pool(s) respectively.

In one subembodiment, the second signaling includes L bit field(s), and the L bit field(s) correspond to the L reference signal resource pool(s) respectively; a given bit field is any one of the L bit field(s), the given bit field corresponds to a given reference signal resource pool among the L reference signal resource pool(s), the given reference signal resource pool includes M1 reference signal resource sets, and the given bit field is used for determining one reference signal resource set from the M reference signal resource sets; the reference signal resource set determined by the given bit field belongs to the L reference signal resource set(s) in the disclosure.

In one subembodiment, the first bit field in the disclosure corresponds to a first reference signal resource pool among the L reference signal resource pool(s), the first reference signal resource pool includes the M1 candidate reference signal resource sets in the disclosure, and the first bit field is used for indicating the first reference signal resource set from the M1 candidate reference signal resource sets.

In one embodiment, the L reference signal resource pool(s) correspond to L BPL(s) respectively.

In one embodiment, the L reference signal resource pool(s) correspond to L panel(s) respectively.

In one embodiment, the third signaling is an RRC signaling.

In one embodiment, the third signaling is a higher layer signaling.

In one embodiment, the third signaling is the first node specific.

In one embodiment, the L reference signal resource set(s) is(are) used for transmissions of radio signals in the first time unit set only.

In one subembodiment, the phrase that the L reference signal resource set(s) is(are) used for transmissions of radio signals in the first time unit set only means that: large-scale properties obtained according to reference signals transmitted in the L reference signal resource set(s) are used for determining transmit powers of radio signals in the first time unit set only.

In one subembodiment, the phrase that the L reference signal resource set(s) is(are) used for transmissions of radio signals in the first time unit set only means that: large-scale properties obtained according to reference signals transmitted in the L reference signal resource set(s) are not used for determining transmit powers of radio signals outside the first time unit set.

In one embodiment, the time unit in the disclosure is one slot, or the time unit in the disclosure is one subframe, or the time unit in the disclosure is one mini-slot.

In one embodiment, the first index is associated to a first reference signal resource, and the first reference signal resource is used for transmissions of radio signals in the first time unit set only.

In one subembodiment, the phrase that the first reference signal resource is used for transmissions of radio signals in the first time unit set only means that: large-scale properties obtained according to reference signals transmitted in the first reference signal resource are used for determining transmit powers of radio signals in the first time unit set only.

In one subembodiment, the phrase that the first reference signal resource is used for transmissions of radio signals in the first time unit set only means that: large-scale properties obtained according to reference signals transmitted in the first reference signal resource are not used for determining transmit powers of radio signals outside the first time unit set.

In one embodiment, the fourth signaling is an RRC signaling.

In one embodiment, the fourth signaling is a higher layer signaling.

In one embodiment, the fourth signaling is the first node specific.

In one embodiment, the first bit field is transmitted in the second signaling.

In one embodiment, one last second-type bit field in time domain among the Q second-type bit field(s) is transmitted in the second signaling.

Embodiment 6

Figure 6:
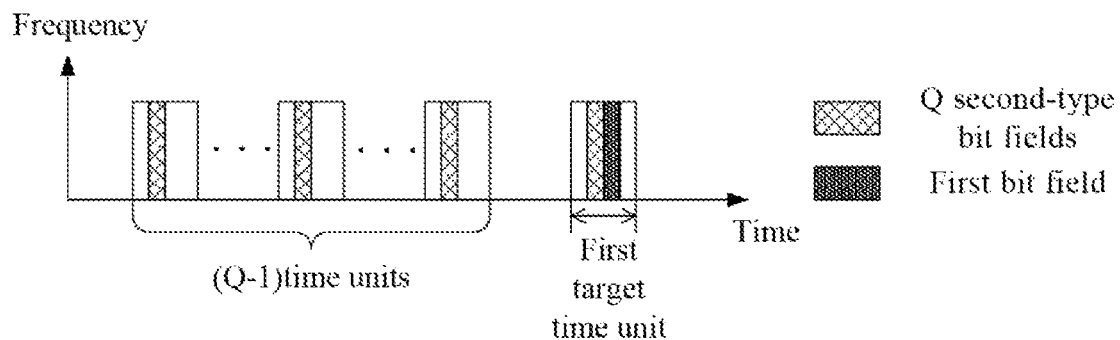
FIG. 6 is a diagram illustrating a relationship between Q second-type bit fields and a first bit field in time domain according to the disclosure.

Embodiment 6 illustrates an example of a diagram of a relationship between Q second-type bit fields and a first bit field in time domain, as shown in FIG. 6. In FIG. 6, (Q−1) former second-type bit fields in time domain among the Q second-type bit fields are transmitted in (Q−1) time units respectively, one last bit field among the Q second-type bit fields which is located in a slot is transmitted in a first target time unit, and the first target time unit is located behind any one of the (Q−1) time units; the first bit field is transmitted in the first target time unit.

In one embodiment, the time unit occupies P multicarrier symbol(s) in time domain, and the P is a positive integer.

In one embodiment, the first target time unit occupies P multicarrier symbol(s) in time domain, and the P is a positive integer.

In one subembodiment, the P is equal to 1.

In one subembodiment, the P is greater than 1, and the P multicarrier symbols are consecutive in time domain.

Embodiment 7

Figure 7:
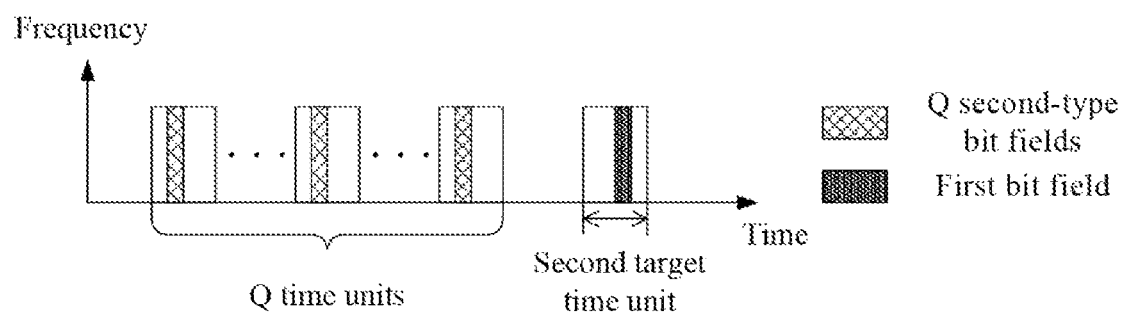
FIG. 7 is another diagram illustrating a relationship between Q second-type bit fields and a first bit field in time domain according to the disclosure.

Embodiment 7 illustrates an example of another diagram of a relationship between Q second-type bit fields and a first bit field in time domain, as shown in FIG. 7. In FIG. 7, the Q second-type bit fields are transmitted in Q time units respectively, and the first bit field is transmitted in a second target time unit; and the second target time unit is located behind any one of the Q time units In one embodiment, the time unit occupies P multicarrier symbol(s) in time domain, and the P is a positive integer.

In one embodiment, the second target time unit occupies P multicarrier symbol(s) in time domain, and the P is a positive integer.

In one subembodiment, the P is equal to 1.

In one subembodiment, the P is greater than 1, and the P multicarrier symbols are consecutive in time domain.

Embodiment 8

Figure 8:
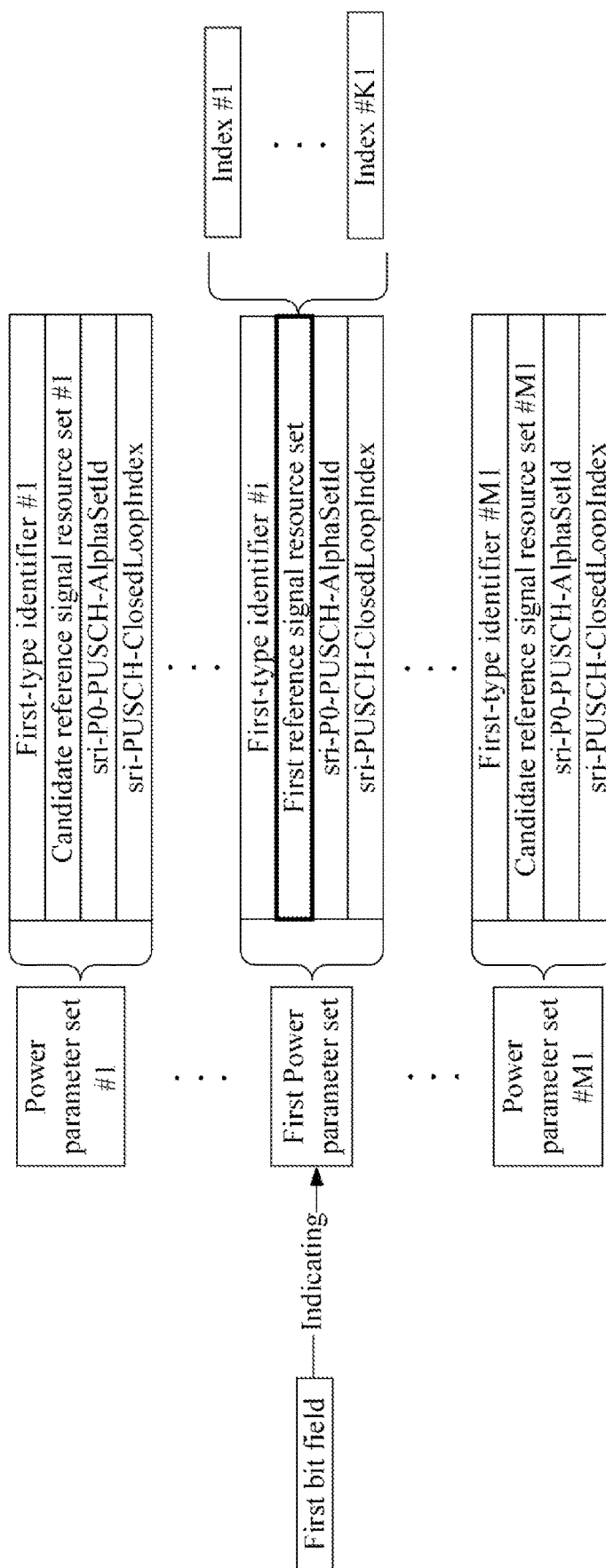
FIG. 8 is a diagram illustrating a first bit field according to the disclosure.

Embodiment 8 illustrates an example of a diagram of a first bit field, as shown in FIG. 8. In FIG. 8, the first bit field is used for determining a first power parameter set from M1 power control parameter sets, and the first power parameter set includes K1 indexes; the M1 power control parameter sets includes a first power control parameter set, and the first power control parameter set includes the first reference signal resource set in the disclosure; the M1 power control parameter sets include the M1 candidate reference signal resource sets in the disclosure respectively; the M1 power control parameter sets correspond to a power control parameter set #1 to a power control parameter set #M shown in FIG. 8; a power control parameter set #i is the first power control parameter set; the i is a positive integer greater than 0 but not greater than M1.

In one embodiment, the K1 indexes correspond to K1 sri-PUSCH-PathlossReferenceRS-Ids shown in FIG. 8 respectively, and the K1 indexes are equal to an index #1 to an index #K1 respectively.

In one embodiment, the M1 power control parameter sets correspond to M1 first-type identifiers respectively; the first bit field is used for indicating one first-type identifier associated to the first reference signal resource set from the M1 first-type identifiers.

In one embodiment, besides the first reference signal resource set, the M1 candidate reference signal resource sets further include at least one given candidate reference signal resource set, the given candidate reference signal resource set includes multiple indexes, and the multiple indexes correspond to multiple reference signal resources respectively.

In one embodiment, the first power control parameter set further includes one sri-P0-PUSCH-AlphaSetId and one sri-PUSCH-ClosedLoopIndex shown in FIG. 8.

In one embodiment, any one of the M1 power control parameter sets includes one sri-P0-PUSCH-AlphaSetId and one sri-PUSCH-ClosedLoopIndex shown in FIG. 8.

In one sub embodiment of the above two embodiments, the sri-P0-PUSCH-AlphaSetId is used for determining p0 and Alpha in TS 38.331.

Embodiment 9

Figure 9:
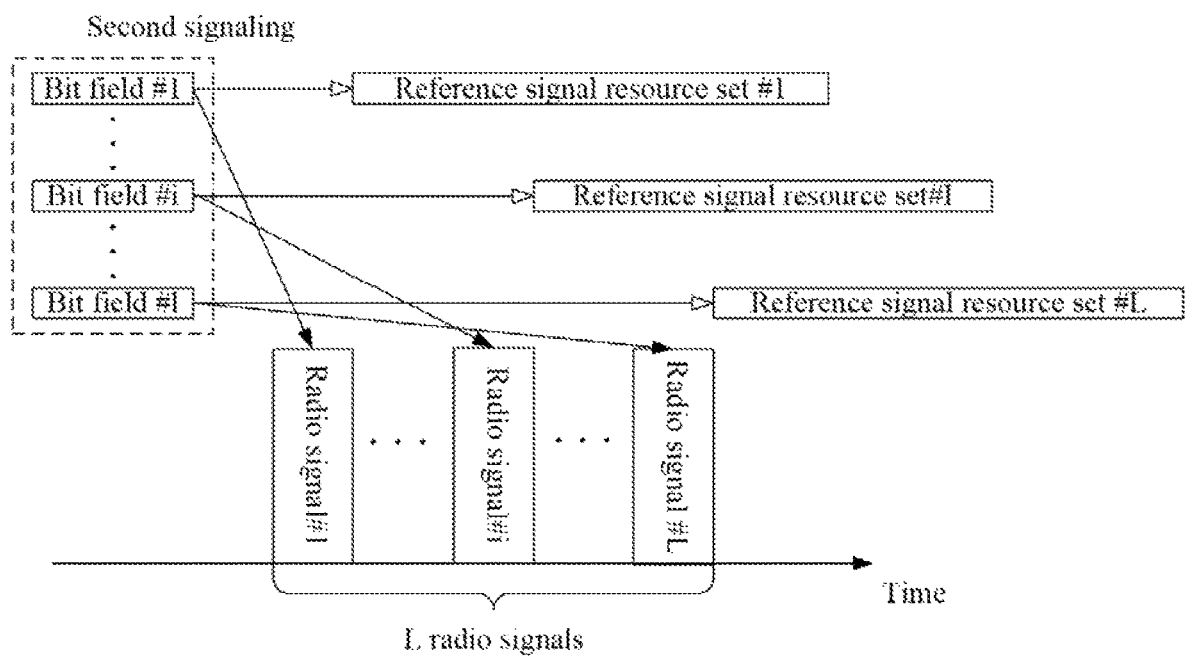
FIG. 9 is a diagram illustrating L reference signal resource sets according to the disclosure.

Embodiment 9 illustrates an example of a diagram of a second signaling, as shown in FIG. 9. In FIG. 9, the second signaling includes L bit fields, and the L bit fields correspond to the L radio signals in the disclosure respectively; the L bit fields are used for indicating the L reference signal resource sets respectively; the L radio signals correspond to a radio signal #1 to a radio signal #L shown in FIG. 9. The L reference signal resource sets correspond to a reference signal resource set #1 to a reference signal resource set #L shown in FIG. 9.

In one embodiment, at least one of the L reference signal resource sets includes multiple reference signal resources, and the multiple reference signal resources correspond to multiple indexes.

In one embodiment, the L reference signal resource sets all include a first reference signal resource, and transmit powers of all the L radio signals are determined by reference to the first reference signal resource.

In one subembodiment, the first reference signal resource is a reference signal resource corresponding to the first index in the disclosure.

In one subembodiment, the first reference signal resource is configured through a higher layer signaling.

Embodiment 10

Figure 10:
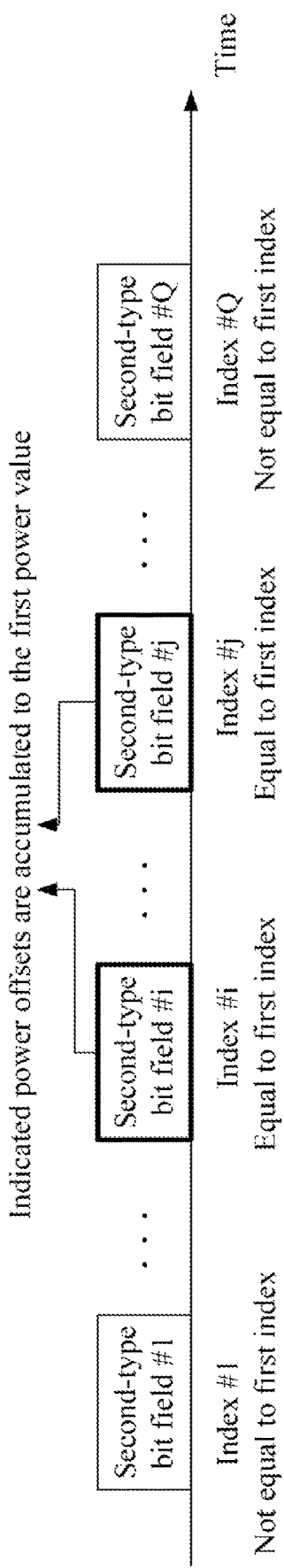
FIG. 10 is a diagram illustrating Q second-type bit fields according to the disclosure.

Embodiment 10 illustrates an example of a diagram of Q second-type bit fields, as shown in FIG. 10. In FIG. 10, power offsets indicated by all second-type bit fields among the Q second-type bit fields that correspond to the first index in the disclosure are used for determining the first power value; the Q second-type bit fields correspond to a second bit field #1 to a second bit field #Q shown in FIG. 10, the second bit field #1 to the second bit field #Q are used for determining an index #1 to an index #Q respectively; an index #i and an index #j shown in FIG. 10 are equal to the first index.

In one embodiment, the Q second-type bit fields are used for determining Q indexes, Q1 indexes among the Q indexes are equal to the first index, Q1 power offsets indicated by Q1 second-type bit fields corresponding to the Q1 indexes are accumulated to the first power value.

In one embodiment, power offsets indicated by all second-type bit fields among the Q second-type bit fields that do not correspond to the first index in the disclosure are not used for determining the first power value.

In one embodiment, the Q second-type bit fields are transmitted in Q DCIs respectively.

Embodiment 11

Figure 11:
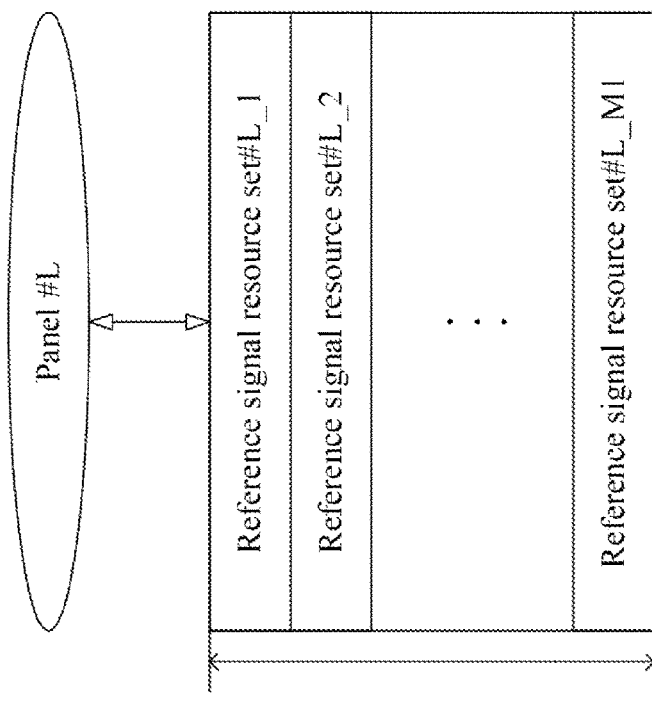
FIG. 11 is a diagram illustrating L reference signal resource pools according to the disclosure.
Figure 11:
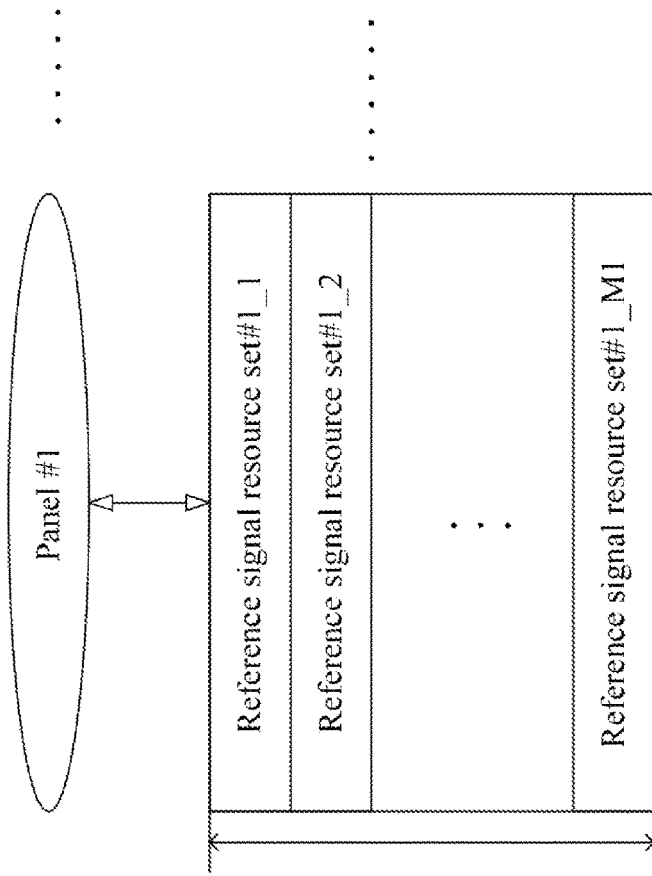

Embodiment 11 illustrates an example of a diagram of L reference signal resource pools, as shown in FIG. 11. In FIG. 11, the L reference signal resource pools are a reference signal resource pool #1 to a reference signal resource pool #L respectively; the L reference signal resource pools correspond to a Panel #1 to a Panel #L respectively; a given reference signal resource pool is any one of the L reference signal resource pools, the given reference signal resource pool includes M1 reference signal resource sets, and any one of the M1 reference signal resource sets includes a positive integer number of reference signal resources.

In one embodiment, the reference signal resource is a CSI-RS resource.

In one embodiment, the reference signal resource is an SRS resource.

In one embodiment, the reference signal resource is SSB resource.

In one embodiment, the reference signal resource corresponds to one index.

In one embodiment, the M1 is equal to a number of integers that the first bit field can indicate.

Embodiment 12

Figure 12:
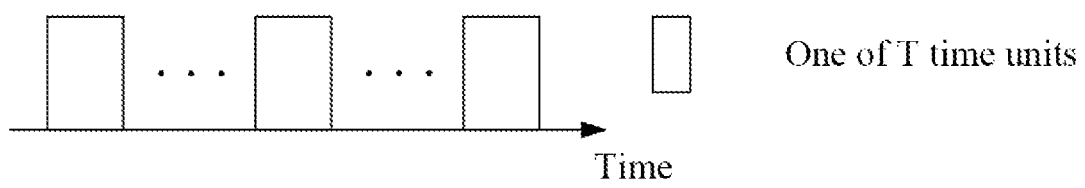
FIG. 12 is a diagram illustrating a first time unit set according to the disclosure.

Embodiment 12 illustrates an example of a diagram of a first time unit set, as shown in FIG. 12. In FIG. 12, the first time unit set includes T time units, and the T is a positive integer greater than 1.

In one embodiment, any one of the T time units is one slot, or any one of the T time units is one mini-slot.

In one embodiment, any one of the T time units includes a positive integer number of consecutive multi carrier symbols.

In one embodiment, the first time unit set is configured through a higher layer signaling.

In one embodiment, the T time units include at least two time units adjacent in time domain, and the two time units adjacent in time domain occupy inconsecutive multi carrier symbols.

Embodiment 13

Figure 13:
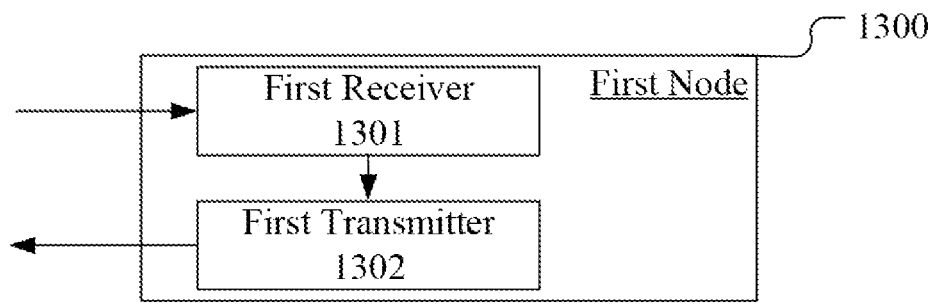
FIG. 13 is a structure block diagram illustrating a first node according to one embodiment of the disclosure.

Embodiment 13 illustrates an example of a structure block diagram of a first node, as shown in FIG. 13. In FIG. 13, a first node 1300 includes a first receiver 1301 and a first transmitter 1302.

The first receiver 1301 receives a first bit field and Q second-type bit field(s), the Q being a positive integer.

The first transmitter 1302 transmits L radio signal(s) at a first power value, the L being a positive integer and a first radio signal being one of the L radio signal(s).

In Embodiment 13, the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

In one embodiment, the first receiver 1301 receives a first signaling, and the first signaling is used for determining that the first reference signal resource set is associated to K1 indexes.

In one embodiment, the first receiver 1301 receives a second signaling, and the second signaling is used for indicating the L reference signal resource set(s).

In one embodiment, the first receiver 1301 receives a third signaling; the third signaling is used for indicating L reference signal resource pool(s); any one of the L reference signal resource pool(s) includes M1 reference signal resource sets; the L reference signal resource set(s) is(are) one subset in the L reference signal resource pool(s); and the M1 is a positive integer greater than 1

In one embodiment, the first receiver 1301 receives a fourth signaling; the fourth signaling is used for determining a first time unit set; the first time unit set includes a positive integer number of time units; and time-domain resources occupied by any one of the L radio signal(s) belong to the first time unit set.

In one embodiment, the first receiver 1301 includes at least the former four of the antenna 452, the receiver 454, the multi-antenna receiving processor 458, the receiving processor 456 or the controller/processor 459 illustrated in Embodiment 4.

In one embodiment, the first transmitter 1302 includes at least the former four of the antenna 452, the transmitter 454, the multi-antenna transmitting processor 457, the transmitting processor 468 or the controller/processor 459 illustrated in Embodiment 4.

Embodiment 14

Figure 14:
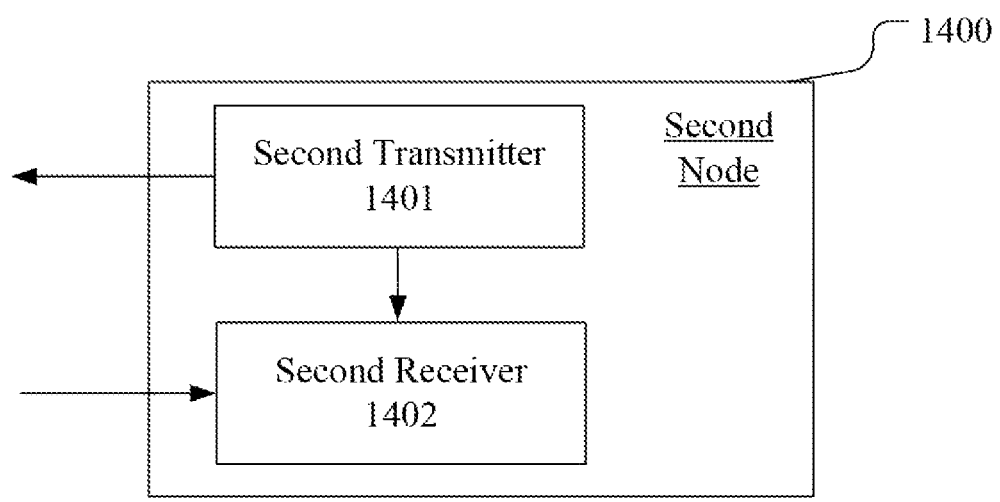
FIG. 14 is a structure block diagram illustrating a second node according to one embodiment of the disclosure.

Embodiment 14 illustrates an example of a structure block diagram of a second node, as shown in FIG. 14. In FIG. 14, a second node 1400 includes a second transmitter 1401 and a second receiver 1402.

The second transmitter 1401 transmits a first bit field and Q second-type bit field(s), the Q being a positive integer.

The second receiver 1402 receives L radio signal(s), the L being a positive integer and a first radio signal being one of the L radio signal(s).

In Embodiment 14, the first bit field is used for determining a first reference signal resource set; the first reference signal resource set is associated to K1 indexes, the K1 being a positive integer greater than 1; each of the Q second-type bit field(s) indicates one power offset, and each of the Q second-type bit field(s) corresponds to one of the K1 indexes; transmit power value(s) of the L radio signal(s) all are a first power value; the first power value is only related to power offsets indicated by all second-type bit fields among the Q second-type bit field(s) that correspond to a first index, and the first index is one of the K1 indexes; the L radio signal(s) are QCLed with L reference signal resource set(s) respectively, the first reference signal resource set is one of the L reference signal resource set(s) that corresponds to the first radio signal; and the first index is related to the L reference signal resource set(s).

In one embodiment, the second transmitter 1401 transmits a first signaling, and the first signaling is used for determining that the first reference signal resource set is associated to K1 indexes.

In one embodiment, the second transmitter 1401 transmits a second signaling, and the second signaling is used for indicating the L reference signal resource set(s).

In one embodiment, the second transmitter 1401 transmits a third signaling; the third signaling is used for indicating L reference signal resource pool(s); any one of the L reference signal resource pool(s) includes M1 reference signal resource sets; the L reference signal resource set(s) is(are) one subset in the L reference signal resource pool(s); and the M1 is a positive integer greater than 1.

In one embodiment, the second transmitter 1401 transmits a fourth signaling; the fourth signaling is used for determining a first time unit set; the first time unit set includes a positive integer number of time units; and time-domain resources occupied by any one of the L radio signal(s) belong to the first time unit set.

In one embodiment, the second transmitter 1401 includes at least the former four of the antenna 420, the transmitter 418, the multi-antenna transmitting processor 471, the transmitting processor 416 or the controller/processor 475 illustrated in Embodiment 4.

In one embodiment, the second receiver 1402 includes at least the former four of the antenna 420, the receiver 418, the multi-antenna receiving processor 472, the receiving processor 470 or the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node and the second node in the disclosure include but not limited to mobile phones, tablet computers, notebooks, network cards, low-power equipment, enhanced MTC (eMTC) equipment, NB-IOT equipment, vehicle-mounted communication equipment, transportation tools, vehicles, RSUs, aircrafts, airplanes, unmanned aerial vehicles, telecontrolled aircrafts, and other radio communication equipment. The base station in the disclosure includes but not limited to macro-cellular base stations, micro-cellular base stations, home base stations, relay base station, eNBs, gNBs, TRPs, GNSSs, relay satellites, satellite base station, air base station, RSU and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising:
   receiving a first signaling;
   receiving a first bit field and Q second-type bit field(s), the Q being a positive integer; and
   transmitting L radio signal at a first power value, the L is 1 and a first radio signal being the L radio signal;
   wherein the first bit field is used for determining a first reference signal resource set; the first reference signal resource set is associated to K1 indexes, the K1 is 2 or 3; each of the Q second-type bit field(s) indicates one power offset, and each of the Q second-type bit field(s) corresponds to one of the K1 indexes; the Q second-type bit field(s) include(s) only one second-type bit field corresponding to the first index; the first power value is only related to power offsets indicated by all second-type bit fields among the Q second-type bit field(s) that correspond to a first index, and the first index is one of the K1 indexes; the L radio signal is Quasi Co-located (QCLed) with L reference signal resource set, the first reference signal resource set is the L reference signal resource set; and the first index is related to the L reference signal resource set; the phrase that the first index is related to the L reference signal resource set means that the K1 indexes are related to the L reference signal resource set; the first signaling is used for determining that the first reference signal resource set is associated to K1 indexes; the first bit filed is transmitted through a physical layer dynamic signaling.

2. The method in the first node according to claim 1, comprising:
   receiving a second signaling;
   wherein the second signaling is used for indicating the L reference signal resource set(s).

3. The method in the first node according to claim 1, comprising:
   receiving a third signaling;
   wherein the third signaling is used for indicating L reference signal resource pool(s); any one of the L reference signal resource pool(s) comprises M1 reference signal resource sets; the L reference signal resource set(s) is(are) one subset in the L reference signal resource pool(s); and the M1 is a positive integer greater than 1.

4. The method in the first node according to claim 1, comprising:
   receiving a fourth signaling;
   wherein the fourth signaling is used for determining a first time unit set; the first time unit set comprises a positive integer number of time units; and time-domain resources occupied by any one of the L radio signal(s) belong to the first time unit set.

5. A method in a second node for wireless communication, comprising:
   transmitting a first signaling;
   transmitting a first bit field and Q second-type bit field(s), the Q being a positive integer; and
   receiving L radio signal, the L is 1 and a first radio signal being the L radio signal;
   wherein the first bit field is used for determining a first reference signal resource set; the first reference signal resource set is associated to K1 indexes, the K1 is 2 or 3; each of the Q second-type bit field(s) indicates one power offset, and each of the Q second-type bit field(s) corresponds to one of the K1 indexes; the Q second-type bit field(s) include(s) only one second-type bit field corresponding to the first index; transmit power value of the L radio signal is a first power value; the first power value is only related to power offsets indicated by all second-type bit fields among the Q second-type bit field(s) that correspond to a first index, and the first index is one of the K1 indexes; the L radio signal is QCLed with L reference signal resource set respectively, the first reference signal resource set is the L reference signal resource set; and the first index is related to the L reference signal resource set; the phrase that the first index is related to the L reference signal resource set means that the K1 indexes are related to the L reference signal resource set; the first signaling is used for determining that the first reference signal resource set is associated to K1 indexes; the first bit filed is transmitted through a physical layer dynamic signaling.

6. The method in the second node according to claim 5, comprising:
transmitting a second signaling;
wherein the second signaling is used for indicating the L reference signal resource set(s).

7. The method in the second node according to claim 5, comprising:
transmitting a third signaling;
wherein the third signaling is used for indicating L reference signal resource pool(s); any one of the L reference signal resource pool(s) comprises M1 reference signal resource sets; the L reference signal resource set(s) is(are) one subset in the L reference signal resource pool(s); and the M1 is a positive integer greater than 1.

8. The method in the second node according to claim 5, comprising:
transmitting a fourth signaling;
wherein the fourth signaling is used for determining a first time unit set, the first time unit set comprises a positive integer number of time units; and time-domain resources occupied by any one of the L radio signal(s) belong to the first time unit set.

9. A first node for wireless communication, comprising:
a first receiver, to receive a first signaling, to receive a first bit field and Q second-type bit field(s), the Q being a positive integer; and
a first transmitter, to transmit L radio signal at a first power value, the L is 1 and a first radio signal being the L radio signal;
wherein the first bit field is used for determining a first reference signal resource set; the first reference signal resource set is associated to K1 indexes, the K1 is 2 or 3; each of the Q second-type bit field(s) indicates one power offset, and each of the Q second-type bit field(s) corresponds to one of the K1 indexes; the Q second-type bit field(s) include(s) only one second-type bit field corresponding to the first index; the first power value is only related to power offsets indicated by all second-type bit fields among the Q second-type bit field(s) that correspond to a first index, and the first index is one of the K1 indexes; the L radio signal is QCLed with L reference signal resource set, the first reference signal resource set is the L reference signal resource set that corresponds to the first radio signal; and the first index is related to the L reference signal resource set; the phrase that the first index is related to the L reference signal resource set means that the K1 indexes are related to the L reference signal resource set; the first signaling is used for determining that the first reference signal resource set is associated to K1 indexes; the first bit filed is transmitted through a physical layer dynamic signaling.

10. The first node according to claim 9, wherein the first receiver receives a second signaling, and the second signaling is used for indicating the L reference signal resource set(s).

11. The first node according to claim 9, wherein the first receiver receives a third signaling; the third signaling is used for indicating L reference signal resource pool(s); any one of the L reference signal resource pool(s) comprises M1 reference signal resource sets; the L reference signal resource set(s) is(are) one subset in the L reference signal resource pool(s); and the M1 is a positive integer greater than 1.

12. The first node according to claim 9, wherein the first receiver receives a fourth signaling; the fourth signaling is used for determining a first time unit set; the first time unit set comprises a positive integer number of time units; and time-domain resources occupied by any one of the L radio signal(s) belong to the first time unit set.

13. The first node according to claim 9, wherein the physical layer dynamic signaling transmitting the first bit field is one DCI, and a format of the DCI is a DIC Format 0_1.

14. The first node according to claim 9, wherein the Q second-type bit field(s) include(s) only one second-type bit field corresponding to the first index.

15. The first node according to claim 9, wherein one group of PUSCH (Physical Uplink Shared Channel) power control parameters determined by the first bit field includes at least one of an sri-P0-PUSCH-AlphaSetId and an sri-PUSCH-ClosedLoopIndex.

16. The first node according to claim 9, wherein the first signaling is an RRC signaling.

17. A second node for wireless communication, comprising:
a second transmitter, to transmit a first signaling, to transmit a first bit field and Q second-type bit field(s), the Q being a positive integer; and
a second receiver, to receive L radio signal, the L is 1 and a first radio signal being one of the L radio signal;
wherein the first bit field is used for determining a first reference signal resource set; the first reference signal resource set is associated to K1 indexes, the K1 is 2 or 3; each of the Q second-type bit field(s) indicates one power offset, and each of the Q second-type bit field(s) corresponds to one of the K1 indexes; the Q second-type bit field(s) include(s) only one second-type bit field corresponding to the first index; transmit power value of the L radio signal is a first power value; the first power value is only related to power offsets indicated by all second-type bit fields among the Q second-type bit field(s) that correspond to a first index, and the first index is one of the K1 indexes; the L radio signal is QCLed with L reference signal resource set respectively, the first reference signal resource set is the L reference signal resource set; and the first index is related to the L reference signal resource set; the phrase that the first index is related to the L reference signal resource set means that the K1 indexes are related to the L reference signal resource set; the first signaling is used for determining that the first reference signal resource set is associated to K1 indexes; the first bit filed is transmitted through a physical layer dynamic signaling.

18. The second node according to claim 17, wherein the second transmitter transmits a second signaling, and the second signaling is used for indicating the L reference signal resource set(s).

19. The second node according to claim 17, wherein the second transmitter transmits a third signaling; the third signaling is used for indicating L reference signal resource pool(s); any one of the L reference signal resource pool(s) comprises M1 reference signal resource sets; the L reference signal resource set(s) is(are) one subset in the L reference signal resource pool(s); and the M1 is a positive integer greater than 1.

20. The second node according to claim 17, wherein the second transmitter transmits a fourth signaling; the fourth signaling is used for determining a first time unit set; the first time unit set comprises a positive integer number of time units; and time-domain resources occupied by any one of the L radio signal(s) belong to the first time unit set.

* * * * *